United States Patent
Chirita et al.

(10) Patent No.: US 8,812,593 B2
(45) Date of Patent: Aug. 19, 2014

(54) METHODS AND SYSTEMS FOR COMMUNITY-BASED CONTENT AGGREGATION

(71) Applicant: Adobe Systems Incorporated, San Jose, CA (US)

(72) Inventors: Paul-Alexandru Chirita, Bucharest (RO); Marius Georgian Zaharia, Bucharest (RO); Robert Joseph Regan, Jr., San Francisco, CA (US); Todd Michael Groner Kopriva, Seattle, WA (US); Mark Eric Nichoson, Palo Alto, CA (US); Kirsti-Marie Aho, San Francisco, CA (US); Alexandru Bogdan Serban, Bucharest (RO); Tanya Ingrid Wendling, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/860,356

(22) Filed: Apr. 10, 2013

(65) Prior Publication Data
US 2013/0231996 A1    Sep. 5, 2013

Related U.S. Application Data

(63) Continuation of application No. 12/109,119, filed on Apr. 24, 2008, now Pat. No. 8,438,224.

(51) Int. Cl.
*G06F 15/16* (2006.01)

(52) U.S. Cl.
USPC .......................................................... 709/204

(58) Field of Classification Search
CPC ........................ G06Q 30/0231; H04L 67/306
USPC .......................................................... 709/204
See application file for complete search history.

(56) References Cited

U.S. PATENT DOCUMENTS

2006/0075019 A1 *  4/2006  Donovan et al. .............. 709/203
2008/0109244 A1 *  5/2008  Gupta ................................ 705/1

OTHER PUBLICATIONS

File History for U.S. Appl. No. 12/109,119 (340 pages).

* cited by examiner

*Primary Examiner* — David X Yi
(74) *Attorney, Agent, or Firm* — Kilpatrick Townsend & Stockton LLP

(57) ABSTRACT

Certain embodiments provide systems and methods for managing elements and users of a community-based content aggregation system. An element is received that includes content associated with a community topic. The element is provided to a moderator and an approval of the element is received. The element is stored with elements attributes that can include a comment, a rating, and a label identifying a sub-topic of the community topic. A search request is received and the element is outputted in response to the request. A rating and a comment on the element is received and stored in the element attributes. Approval of the comment is received. In some embodiments, points may be awarded to a user for participating in the community and the user's user level may be modified based on the points of the user.

14 Claims, 10 Drawing Sheets

METHODS AND SYSTEMS FOR COMMUNITY-BASED CONTENT AGGREGATION

CROSS-REFERENCE TO RELATED APPLICATION

This application is a continuation application of U.S. patent application Ser. No. 12/109,119 filed on Apr. 24, 2008, now U.S. Pat. No. 8,438,224 the contents of which are incorporated herein by reference in their entirety.

FIELD OF THE DISCLOSURE

The present disclosure relates generally to information sharing and more particularly to information sharing by community-based content aggregation.

BACKGROUND

The Internet and other networks can provide a searchable collection of data and information. Search engines provide a portal to the collection by allowing users to conduct searches using a number of different search parameters. Social networking websites can provide information sharing capabilities that enhance the power of the Internet and other networks. People from across the globe or across the street can share ideas, information, and build relationships using such sites. One criterion that most social networking websites share is providing at least some power to website users—allowing the users to contribute their own ideas and creativity to enhance website content and appeal to users.

The amount of content available via the Internet has grown substantially. The relatively large amount of content, however, makes searching and finding accurate and relevant content to particular search parameters difficult. Some social networking websites provide tagging or other organizational functionality to allow users to organize content in a more search-friendly manner. Such sites, however, allow users to use any tag organization and the collection of tagged content from all users can result in a disorganized collection.

Websites that organize content in a helpful manner may still experience difficulty in providing accurate and relevant content. Users adding content to sites can be a powerful tool to increase the variety and amount of content. Without diligent review, however, user-added content can include inaccurate information, incomplete information, or otherwise irrelevant information that other users must filter, either manually or otherwise, to find the information they seek. To assist filtering, some websites allow site users to rank or comment on content, with highly ranked content being more easily accessible to lower ranked content on the same topic. The ranking and comments may be manipulated by users who wish for their content to be highly ranked and fail to recognize or reward "good" or relevant content.

Even if websites organize content and ensure "good" content is available and easily found, they may suffer from a lack of "good" content being added by users. For example, users may have no reason to add content to a website or a network database. Accordingly, a need exists for a web-based community that includes a searchable collection of content in which users can add content to the collection and receive recognition of their participation in the community.

SUMMARY

Certain aspects and embodiments provide systems and methods for a community-based content environment. In one embodiment, an element associated with content related to a community topic is provided to a moderator. The element can be an electronic file, such as a document or a webpage, or a link to an electronic file and the content associated with the element may be text, video, or other media. The community topic may be a subject to which the community generally relates. Examples of a community topic include a software product, consumer product, and services, such as tax preparation. An instruction is received from the moderator to include the element in the community-based content environment. Element attributes associated with the element are received. Element attributes may be characteristics of the element. The element attributes can include a comment from a user, a rating, and a label identifying a sub-topic of the community topic. A content management function is performed after receiving an instruction from the moderator to perform the content management function. The content management function can include modifying the element or element attributes. A search request regarding the community topic can be received. The element and at least part of the element attributes may be outputted in response to the search request.

In one embodiment, users of a community-based content aggregation environment can be managed. A user profile for a user requesting a registration is created. A first user level is assigned to the user. The first user level corresponds to access to a first set of community tools. User activity is detected. Points to award to the user are determined based on the user activity. The points are stored in the user profile. The stored points are determined to exceed a pre-set threshold. The first user level is modified to a second user level. The second user level allows the user to access the first set of community tools and a second set of community tools.

In one embodiment, a community-based content aggregation system is provided. The system includes a processor-based device that includes a community engine stored on a computer-readable medium and executable by a processor. The community engine is adapted to create a first user profile for a first user and a second user profile for a second user. The first user profile and second user profile include a first user level. The first user level allows the first user and the second user to access a first set of community tools. The community engine is adapted to receive an element from the first user. The element is associated with content related to a community topic. The community engine receives approval of the element from the moderator. The approval includes an instruction to include the element in the community-based content aggregation system. Element attributes are received that are associated with the element. The element and element attributes are stored on the computer-readable medium. Points to award to the first user are determined based on the stored element. Points to award to the second user are determined based on the comment. In some embodiments, the points in either the first user profile or the second user profile exceed a pre-set threshold and the community engine modifies the first user level in that profile to a second user level that allows access to additional community tools.

These embodiments are mentioned not to limit or define the inventive concepts disclosed herein, but to provide examples of embodiments to aid understanding thereof. Embodiments are discussed in the Detailed Description, and further description of the inventive concepts is provided there. Advantages offered by the various embodiments may be further understood by examining this specification.

BRIEF DESCRIPTION OF THE DRAWINGS

These and other features, aspects, and advantages are better understood when the following Detailed Description is read with reference to the accompanying drawings, wherein:

FIG. 8 is a screen shot of search results returned with additional information according to one embodiment of the present disclosure;

FIG. 9 is a screen shot of a user management tool for administrators according to one embodiment of the present disclosure; and FIG. 10 is a screen shot of a notification tool according to one embodiment of the present disclosure.

DETAILED DESCRIPTION

Figure 1:
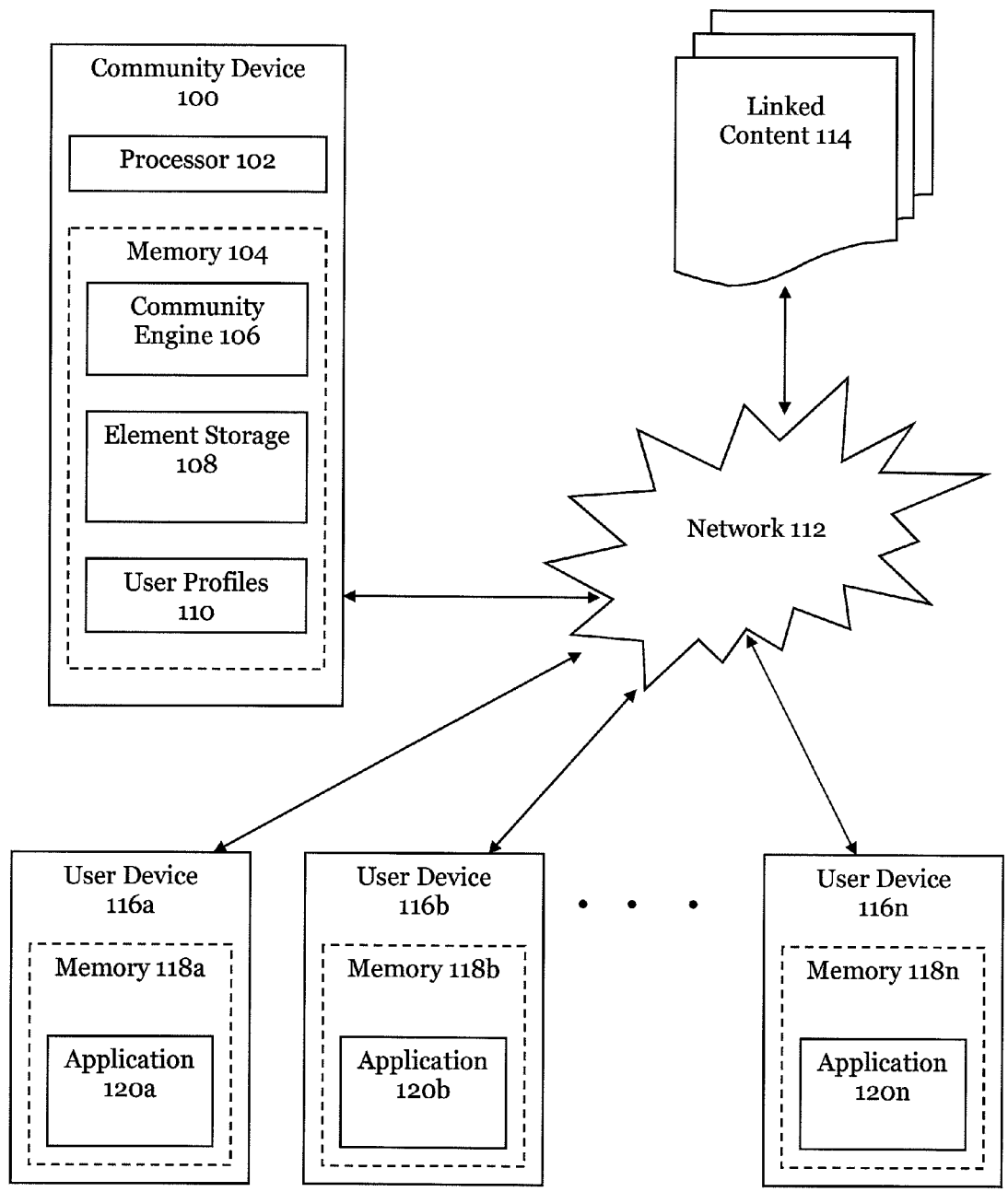
FIG. 1 is a system diagram of a community-based aggregation system according to one embodiment of the present disclosure.

Certain aspects and embodiments described herein provide a community that includes a community-based content aggregation method and system that allows for enhanced content searching. In some embodiments, community users are provided with an incentive to contribute to the community by performing certain activities to promote community goals. The community may be a web-based community in which users participate in the community over a network, such as the Internet. In some embodiments, at least part of the community may be accessed via a software tool or application.

The community can include elements associated with content related to the community topic. An element may be an electronic file, such as a document or a webpage, or link to an electronic file. The electronic file can include content, such as text, video, sound, or other media, generally related to a community topic. The community topic may be one or more products and/or services. Examples of products include consumer goods, such as appliances, and software tools. Examples of services include tax return preparation, vehicle maintenance, and buying real estate. The elements may be from any source, such as community users, third-parties, and organizations that promote or market products or services that may be the subject of the community topic. Elements that are links to electronic files can include a location on a network where the electronic files are located.

Each element can be associated with element attributes. Element attributes may be characteristics of the element or the content associated with the element. Examples of element attributes include a comment received from the user, a rating or average rating, a label identifying a sub-topic of the community topic to which the content relates. The sub-topic can be a category of information related to the community topic. In some embodiments, the element attributes can also include search properties associated with the element. Examples of search properties include relevancy ranking or other search ranking that causes the element to be returned in a higher or lower order of search results in response to a search request.

Community users may be categorized into different user levels. Each user level may have access privileges to different tools provided by the community. Examples of user levels include administrator, expert user, moderator, registered user, and un-registered user. Community users may be categorized into user levels based on their contributions to the community and/or user credentials. In some embodiments, points are awarded to community users based on their contributions to the community. Upon reaching a pre-set point threshold, the community users may change user levels and receive access to additional community tools. User levels can be provided as an incentive for users to contribute to the community and attain a higher user level with access to additional community tools that may include managing the community, editing and deleting elements or comments, or approving elements to be included in the community.

The community may be stored on a computer-readable medium in one or more servers or other processor-based devices that are adapted to communicate with one or more user devices operated by community users. The community can include community tools that allow users to cause the community to perform various functions. Examples of community tools include: (1) receiving elements to include in the community collection; (2) providing the elements to one or more users for review; (3) receiving an instruction to include the elements in the community collection; (4) receiving a label or other attribute to associate with an element; (5) receiving a comment on an element and associating the comment with the element; (6) receiving a rating for an element and associating the rating with the element; (7) receiving a search request that includes search parameters and returning elements based on the search parameters; and (8) detecting whether a user selects one or more of the elements in the returned search results and using the detection to modify attributes associated with the elements. As explained in more detail below, other community tools may be provided. User access to certain community tools may depend on the user level of the user. Furthermore, use of community tools can be monitored and search properties associated with elements can be modified based on results of the monitoring.

Illustrative System Implementation

Methods according to various embodiments of the inventive concepts disclosed herein may be implemented on a variety of different systems. An example of one such system is illustrated in FIG. 1. The system includes a processor-based device, such as community device 100, which includes a processor 102 and a computer-readable medium, such as memory 104. The community device 100 may be any type of processor-based device, examples of which include a computer and a server. In some embodiments, the community device 100 is more than one device that can include a web server for generating web pages and a data server for accessing and supplying data such as elements associated with content.

Memory 104 may be adapted to store computer-executable code and data. Examples of memory 104 can include magnetic disks, optical storage devices, floppy disks, hard disks, random access memory, semiconductor storage devices, and flash memory. Computer-executable code may include an application, such as a webpage or data management application, which can be used to manage data and generate webpages for users. The application may include a community engine 106 that, as described in more detail below, may be adapted to perform methods according to various embodiments to provide the community and access to community tools. In some embodiments, the community engine 106 may be a separate application that is executable separate from, and optionally concurrent with, the application.

Additional data may be stored in memory 104. For example, elements may be stored in element storage 108 and user information in user profiles 110. Each element may be associated with content related to a community topic. For example, the element may be an electronic file or a link to an electronic file that includes content, such as text, video, sound, or other media, associated with the community topic. A community topic may be any topic for which users wish to find information. Each element can be associated with element attributes. Element attributes can include comments, ratings, search properties, or a label that identifies one or more sub-topics of the community topic. Elements that are links to content may be a location, such as a Uniform Resource Locator (URL), where linked content 114 can be accessed and reviewed over a network 112. Linked content 114 may be located on a separate web server, computer, or other processor-based device adapted to receive a request for information and respond with the requested information.

User profiles 110 can include profiles of community users. The community engine 106 may create a user profile for each user who is registered and manage user levels and user access to community tools by updating the user profiles 110. The user profiles 110 may also be used to authenticate a user before allowing them to access certain community tools. For example, a username and password may be stored in a user profile of a user. When the user wishes to sign-on to the community, the community engine 106 can receive a username and password from a user device 116*a-n* and compare it to the username and password stored in the user profile. The community engine 106 may be configured to allow un-registered users to access some community tools using a user device 116*a-n*.

Users can employ user devices 116*a-n* to access the community device 100 or linked content 114 over the network 112. The user devices 116*a-n* may be any device adapted to communicate over network 112. Examples of user devices 116*a-n* include a computer, personal digital assistance (PDA), mobile phone, or any Internet appliance. The user devices 116*a-n* can each include a computer-readable medium, such as memory 118*a-n*. An application 120*a-n* that is adapted to access the community may be stored in memory 118*a-n*. For example, the application 120*a-n* may be a software application for generating and modifying photographs or other images. The application 120*a-n* may be adapted to receive elements and at least part of the element attributes from the community. In some embodiments, the elements and at least part of the element attributes can be accessed by the user via the application 120*a-n*. The elements and at least part of the element attributes may also be integrated with the application 120*a-n* to allow the user to access the elements and at least part of the element attributes at a later time.

In some embodiments, the user devices 116*a-n* include an input device and an output device. The input device may be adapted to receive user input and communicate the user input to the user device. Examples of an input device include a keyboard, mouse, scanner, and network connection. User inputs can include instructions that cause the user device to send data, such as a request for information, to the community device 100 via the network 112. Examples of the output device include a monitor, network connection, and printer. The output device may be adapted to provide data or visual output received from the community device 100. In some embodiments, the output device can display a visual representation of the data and provide a graphical user interface (GUI) that includes one or more selectable buttons to allow users to send data to the community device.

The network 112 may be any type of network allowing two or more devices to exchange information. Examples of network 112 can include the Internet or an intranet. In some embodiments, the community device 100 is connected to one or more databases (not shown) via the network 112 or a direct or wireless connection. Element storage 108 and/or user profiles 110 may be stored in the one or more databases and accessed by the community engine 106.

Illustrative Methods for Providing Community-Based Content Aggregation

Figure 2:
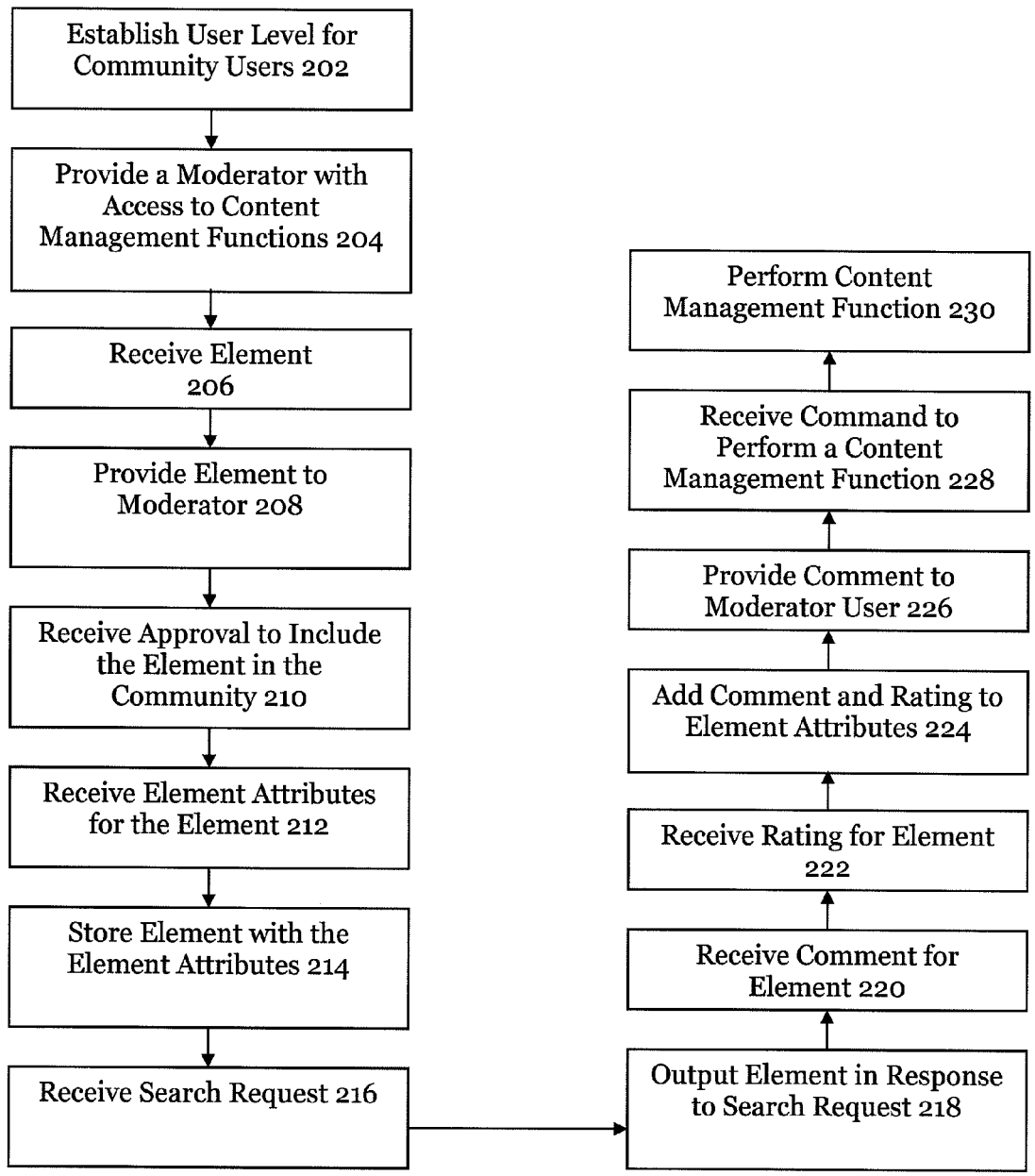
FIG. 2 is a flow chart illustrating creation of a community-based aggregation system according to one embodiment of the present disclosure.

Various methods according to various embodiments of the inventive concepts disclosed herein can be used to provide community-based content aggregation and access to community tools. FIG. 2 illustrates one embodiment of a method for providing community-based content aggregation. For purposes of illustration only, the elements of this method are described with reference to the system depicted in FIG. 1. Other implementations are also possible.

In block 202, the community engine 106 assigns a user level for each community user who may access the community via user devices 116*a-n* and the network 112. In some embodiments, the community engine 106 creates a user profile for each user. The user profile may include information associated with the user. The information can include a username, password, personal information or professional credentials, user level, user location, and points accrued by using the community. The information can also include statistics regarding the community use of the user, such as the frequency of community access and activities. The user level assigned to the user is stored in the user profile for the user.

The user level for each user may be assigned using any criteria and selected from a pre-set list of user levels. Examples of user levels from which the community engine 106 selects to assign to users include an administrator, moderator, expert, and registered user. The administrator may have access to all community tools and be charged with managing moderators or other aspects of the community. Moderators may have access to most community tools and be charged with managing elements and/or community users. Experts may have access to community tools associated with ensuring the content and labels identifying community sub-topics are up-to-date or otherwise accurate. Registered users may have access to a sub-set of community tools. The community engine 106 may receive an instruction from a community administrator or moderator to assign a particular user level to a particular user. The community engine 106 may also or alternatively automatically assign a user level to each user based on pre-set criteria. For example, the community engine 106 may be configured to assign all newly registered users with a user level of "registered user" or the community engine 106 may be configured to assign a user level of "moderator" or "expert" to users who have names or other matching information from a list of information provided by the administrator.

In some embodiments, the community may only be accessed by those users who have registered and been assigned a user level. In other embodiments, un-registered users may be assigned a user level of un-registered user and receive access to a limited set of community tools. For example, a temporary guest profile may be created for users who do not register with the community and the community engine 106 assigns a user level of un-registered user. The community engine 106 may determine the community tools available to each user based on user levels. Community tools can include any functionality provided by the community engine 106. In some embodiments, at least one user receives a moderator user level and allowed access to most community tools.

In block 204, the community engine 106 provides at least one user that has been assigned a moderator user level with access to content management functions. Content management functions may be any community tool that is used to manage community elements associated with content. Examples of content management functions include approving elements for inclusion in the community, deleting elements, editing elements, and modifying element attributes or other properties associated with elements, including modifying search properties and approving, editing, and deleting comments associated with elements. In some embodiments, the content management functions are assigned to all users who have been assigned to the moderator user level. The community engine 106 may also provide access to user management functions to selected users who have been assigned a moderator user level.

In block 206, the community engine 106 receives an element. The element may be an electronic file or a link to an electronic file that includes content generally associated with the community topic. For example, the community topic may be a software application. The element may be a link to a website that includes an article on ways to use a tool offered by the software application. Elements can be received from any source. An example of a source is a community user. For example, a user operating one of the user devices 116a-n may cause the user device to transmit an element to the community device 100 and the community engine 106 receives the element. In some embodiments, the community engine 106 receives elements that are tangentially related to the community topic or otherwise unrelated to the community topic. As explained in more detail below, certain embodiments are adapted to identify such elements and potentially exclude them from the community collection.

In block 208, the community engine 106 provides the received element to at least one moderator. The community engine 106 may provide the received element via any method. In some embodiments, the community engine 106 sends a notification to the moderator that the element is available for review and a network location where the element can be viewed. In other embodiments, the community engine 106 sends the element to the moderator through a communication tool such as email. The moderator may use a user device to access a webpage that includes the content associated with the element and review the content. The moderator can review the content and determine whether the element should be included in the community collection.

In block 210, the community engine 106 receives an approval from the moderator to include the element in the community. In some embodiments, selectable options are provided to the moderator when the element is provided for review. The selectable options can correspond to an approval to include the element or an instruction to disregard the element and not include it in the community collection. An option may also be provided allowing the moderator to communicate with the community user that submitted the element, the content author, or other source. In other embodiments, the community engine 106 receives an instruction from the moderator approving the element. In some embodiments, the community engine 106 may receive an instruction from the moderator disapproving the element. For example, if the element includes marketing material or advertisements for the software application that may be the community topic, or for another produce or service, the moderator may decide to not include the element in the community and the community engine 106 receives such an instruction.

In block 212, the community engine 106 receives element attributes for the element. Element attributes may include characteristics or other information associated with the element or content. Examples of element attributes include comments, ratings, search properties, and a label identifying a sub-topic of the community topic to which the content relates. The label may be a word or other indicator identifying a particular sub-topic. For example, the community topic may be a software application for generating and editing images. Sub-topics can include creating animated images, editing animated images, adding color to images, and modifying image color. For each sub-topic a label can be provided that identifies that subject matter of the sub-topic. The community can include a finite number of labels from which users can select and associate with the element. The finite number of labels may be modified by administrators, experts and/or moderators or pre-set. In some embodiments, the finite number of labels may be received from users having an expert user level. For example, users who have certain credentials and/or have a reputation of knowledge in the community topic or content organization in general may be given an expert user level by the community engine 106 and allowed to access community tools such as defining the finite labels available for application. In other embodiments, all users may be provided with the ability to select a label from a list of labels to assign to the element.

Search properties can be criteria used by a search engine to return results that include elements or a list of elements in response to a search request. The criteria can include keywords associated with information in the content associated with the elements or an element score. The element score may be an input received from an administrator or moderator or generated by the community engine 106. In some embodiments, the element score is based on the number of times the element was selected or not selected after it was returned to users in response to a search, reputation of the content author, or any characteristic regarding the content quality or the substance of the information of the element. Search properties can also characteristics of other element attributes such as a rating. As described in more detail below, a rating can be received from a user after he or she reviews the content associated with the element and reflects his or her opinion as the usefulness or quality of the information in the content.

In block 214, the community engine 106 stores the element with its element attributes. The element and its element attributes may be a file that is stored in element storage 108. The community engine 106 may configure the element and element attributes to be searchable and accessible. The community engine 106 may also access and return part of the element and element attributes in response to a search or provide part of the element and element attributes to an administrator or moderator.

In block 216, the community engine 106 receives a search request. The search request may be received from a user via one of the user devices 116a-n over the network 112. The search request can include a request for elements that are relevant to the search criteria. The search criteria can include search words, dates, language, location of search words within the content of the element or element attributes, or element file type. The community engine 106 can use the search criteria to formulate a search and conduct the search on the content of the stored elements and elements attributes to output elements and element attributes in response to the search request in block 218. The outputted elements, a link to the outputted elements, and/or other element attributes associated with the outputted elements may be provided to users over the network 112. For example, the community engine 106 can formulate a webpage that contains the outputted elements or a list identifying the outputted elements and a rating and any comments associated with the outputted elements. The webpage can be transmitted over the network to the user device of the user that formulated the search request. The user device can display the webpage to the user for review.

In block 220, the community engine 106 receives a comment for the element. The comment may be received from the user after they access the electronic file associated with the element and review information in it. Users can access the electronic file by selecting a link on the webpage and the electronic file is returned to the user device of the user. An option on the webpage returned to the user can include an area where comments can be provided. The user can input the comment and send the comment to the community device 100. The comment may be an opinion on the information, a critique of the information, or an addition to the information. The community engine 106 can receive the comment and associate it with the element for which the user made the comment.

In block 222, the community engine 106 receives a rating associated with the element. The rating is received from a user device over the network 112. The rating can be a relative measurement of the quality, accuracy, or other characteristic of the element in the opinion of the user. In some embodiments, the rating is a number within a range of numbers, such as 1-5, or a number of characters, such as a star-shaped character, out of a finite number of characters. The rating may be averaged with a current rating of the element to generate a new rating.

In block 224, the community engine 106 adds the comment and rating to element attributes. The comment and rating can be added to the element attributes that are associated with the element for which the comment and rating were received. In some embodiments, the community engine 106 automatically adds the comment and rating to the element attributes upon receipt. In other embodiments, the community engine 106 adds the comment and rating to the element attributes upon receiving an instruction from an administrator or moderator to add the comment and rating.

In block 226, the community engine 106 provides the comment to a moderator. In some embodiments, the community engine 106 transmits a message to the moderator over the network 112 that a new comment is available and provides a location where the new comment can be accessed. In other embodiments, the community engine 106 sends the comment to the moderator along with an identification of the element associated with the comment. The moderator can access the comment and review it to determine if it should be included in the community. For example, comments that add helpful information, critiques, or otherwise are relevant to the element may be approved by the moderator while comments that are nonsensical, inflammatory, derogatory, or otherwise irrelevant may not be included in the community.

In block 228, the community engine 106 receives an instruction to perform a content management function from the moderator. The instruction may be received after the moderator selects an option and inputs the instruction using his or her user device and causes the user device to transmit the instruction to the community device 100 over the network 112. The content management function may be any activity for managing the elements or element attributes in the community. Content management functions can include: (1) approving the comment for inclusion in the community; (2) disapproving the comment, causing it to be excluded from the community; (3) editing elements; (4) sending a message to content authors requesting that they edit the element; (5) adding elements; (6) deleting elements; (7) modifying search properties associated with the elements; (8) modifying the ranking of the elements; and (9) modifying the label associated to elements.

In block 230, the community engine 106 performs a content management function based on the received instruction. For example, the community engine 106 may modify the element or the elements attributes or delete the element and its element attributes based on the instruction. In some embodiments, the community engine 106 automatically generates a message to content authors in response to certain received instructions, such as a need to revise or edit the element.

Once an element is added to the community, it may be accessible to community users. For example, a user may cause the community engine 106 to conduct a search with supplied search parameters. The community engine 106 can output the element and at least part its element attributes in response to the search. The element can be outputted on a webpage generated by the community engine 106 or outputted to an application. The application can display the element and element attributes to the user or include the element and element attributes in a set of information for later access by the user.

Moderators or administrators can use community tools provided in some embodiments to manage elements and other contributions to the community to periodically check the collection of information in the community and ensure it promotes community goals. Some community goals can include providing users with access to accurate, helpful, or otherwise quality elements regarding a community topic. The community can be a source for users to both receive quality information and make quality contributions to the community. In some embodiments, the community-based aggregation system may provide user management tools that can be used to provide users with an incentive to contribute to the community.

Illustrative Community User Management

Figure 3:
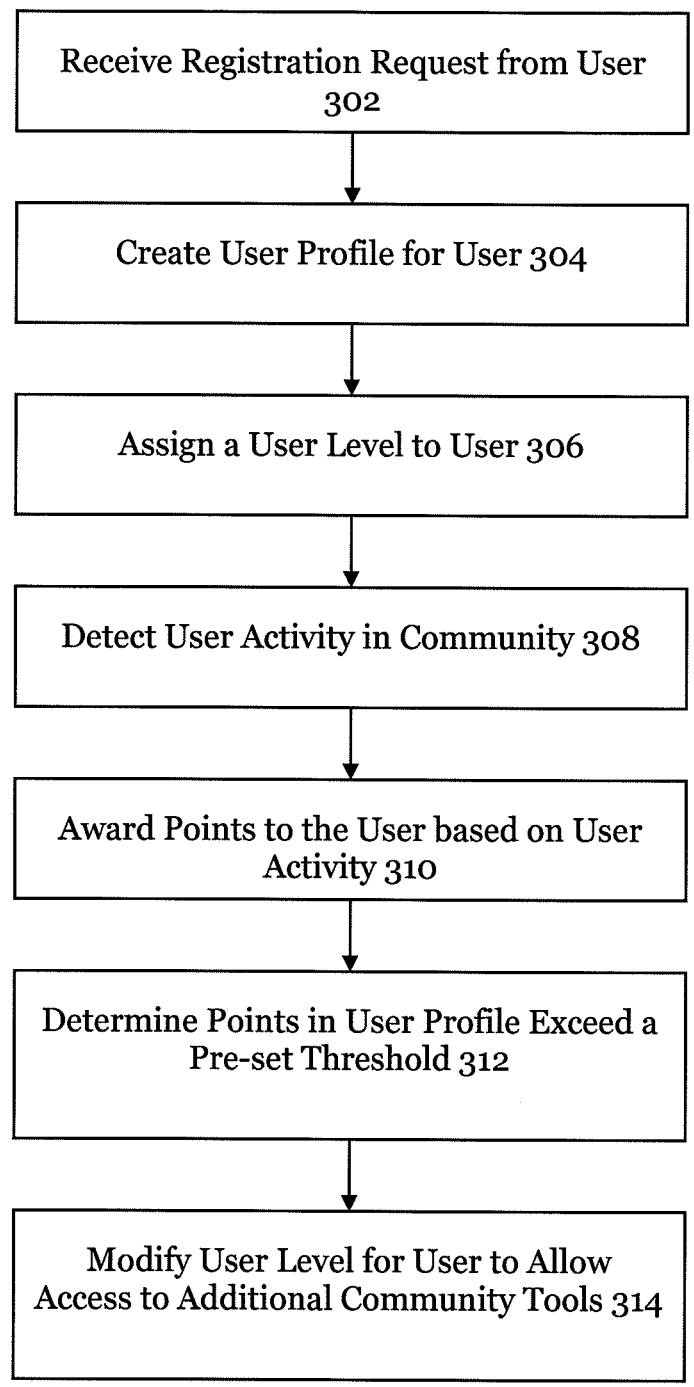
FIG. 3 is a flow chart illustrating community user management according to one embodiment of the present disclosure.

As described above, some embodiments of the community can include different user levels. Each user level can correspond to access to different community tools. For example, one user level may allow a user to access a subset of community tools, while a second user level may allow a user to access most or all of the community tools. User levels can include an administrator, moderator, expert user, registered user and unregistered user. Additional levels may be utilized in some embodiments. In addition, the administrator and moderator user levels can be the same user level. Certain methods can be provided in some embodiments that allow users to advance user levels and receive access to additional community tools if the users contribute to the community or otherwise meet certain criteria. FIG. 3 illustrates one method for managing community users according to one embodiment that may provide users with incentives to make quality contributions to the community. For purposes of illustration only, the method of FIG. 3 is described with reference to the system shown in FIG. 1. Other system implementations are possible.

In block 302, the community engine 106 receives a registration request from a user. A user may access a home or base webpage provided by the community engine 106 and, using a user device, input a request that the community engine 106 register the user. The request may include information associated with the user. In some embodiments, the information may be a username and password preferred by the user. In other embodiments, the information also includes personal information associated with the user, such as professional credentials, experience with the community topic, name, and job title.

In block 304, the community engine 106 creates a user profile for the user. The user profile can be an electronic file in which the user's information is stored. The user profile can be stored in memory 104.

In block 306, the community engine 106 assigns a user level to the user and stores the user level in the user profile. The user level may be automatically selected by the community engine 106 based on pre-set criteria or an existing administrator or moderator can select the user level for users. The pre-set criteria may include a list identifying people by names or other identification that have a reputation for knowledge and experience in the community topic or otherwise deserve to be a moderator or expert user.

In block 308, the community engine 106 detects user activity in the community for each user. User activity can include proposing elements to add, providing comments, rating elements, accessing elements, proposing corrections to elements, or otherwise accessing and using community tools. In some embodiments, the frequency with which the user accesses and uses certain community tools is also detected.

In block 310, the community engine 106 awards points to users based on the detected user activity and stores the points for each user in their respective user profile. The points may be automatically awarded based on pre-set point criteria or an instruction to award points to users may be received from an administrator or moderator. The pre-set point criteria can include an identification of a number of points awarded to users after they perform certain activities. The following are examples of points that may be awarded to users upon completion of the corresponding activity:
1. A comment from the user is approved—one point.
2. A correction or addition proposed by the user is incorporated into the community content—ten points.
3. The user submits an element and it is approved—fifty points.
4. A link to an element is suggested and added—five points.
5. The user submits comments on a regular basis and the comments are usually approved—twenty points.
6. A user with a moderator user level reviews and approves several comments or element submissions within a certain amount of time—thirty points.

Any point or award system can be utilized. Furthermore, points may be awarded for any user activity deemed to be valuable or potentially valuable to promoting the community goals. For example, the community may include a forum in which users can post and review messages. Points may be awarded to users who provide accurate and helpful answers to questions or problems submitted by other users. Awarded points can be added to points already in a user profile. Points can also be taken away from a user if the user performs an activity that is against community rules or otherwise fails to promote community goals. An example of an activity for which points may be taken away is a user that submits a derogatory, obscene, or inappropriate comment or frequently submits inappropriate or irrelevant elements.

In block 312, the community engine 106 determines that points in a user profile exceed a pre-set threshold. In some embodiments, the community engine 106 automatically determines that points in a user profile exceed a threshold amount of points. In other embodiments, an administrator or moderator reviews a report indicating a point level for each user and sends an instruction to the community engine identifying users for which points exceed a pre-set threshold or amount.

In block 314, the community engine 106 modifies the user level for the user having points that exceed the pre-set threshold to provide the user with access to additional community tools. In some embodiments, an administrator or moderator may also or alternatively send the user a reward, such as a product, coupons, or gift certificates, for collecting points that exceed the pre-set threshold.

Element Monitoring and Modification

Figure 4:
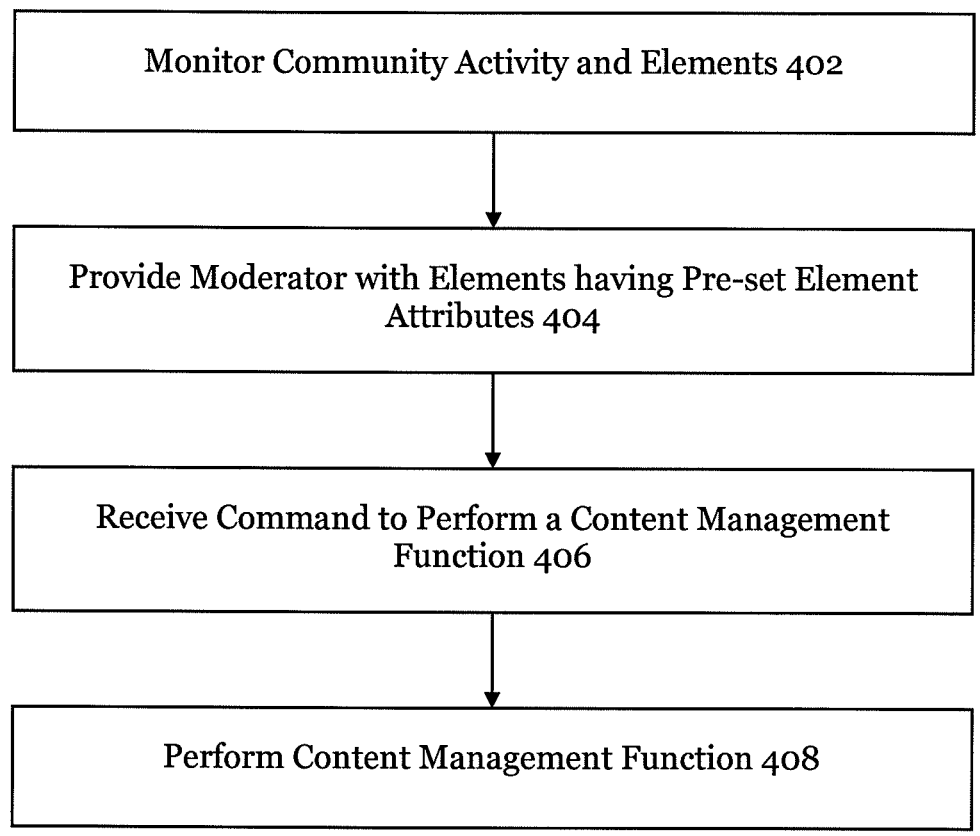
FIG. 4 is a flow chart illustrating community content management according to one embodiment of the present disclosure.

Community-based content aggregation systems according to some embodiments may combine the autonomous functionality provided by a community engine with oversight and additional community input from users with enhanced user levels, such as administrators, moderators, or experts, to provide community element management. For example, some elements may remain in the community element collection for long periods of time without being accessed or reviewed. Other elements may be accessed frequently, but retain a low rating. Certain tools may be provided that allow for such elements to be identified and modified, if needed. FIG. 4 illustrates one embodiment of a method for monitoring and managing elements and is described with reference to system of FIG. 1. Other system implementations are also possible.

In block 402, the community engine 106 monitors community activity and elements. In some embodiments, the community engine 106 may receive an indication of each time an element or element attributes change or a user activity is performed and store the indicator in a community log. In other embodiments, the community engine 106 monitors elements and activity by updating data stored in memory 104 for each modification, change or occurrence.

In block 404, the community engine 106 detects elements having pre-set element attributes and provides an identification of the elements to a moderator. For example, a moderator may provide a request to the community device 100 for elements having element attributes of certain values. In response to the request, the community engine 106 may provide an identification of elements having element attributes that match the values. In other embodiments, the community engine 106 is configured to automatically identify elements once their element attributes have a pre-set value. An example of a pre-set value is a element attribute indicating that the element has not been accessed, reviewed, or otherwise selected by a community user within a pre-set time. The moderator can access the identified elements and review them.

In block 406, the community engine 106 receives an instruction from the moderator to perform a content management function. The content management function can include removing the element from the community, editing the element, or modifying an element attribute associated with the element. In block 408, the community engine 106 performs the content management function.

In some embodiments, the community engine 106 may be unable to modify an element's content by editing it in response to an instruction received from the moderator. For example, the element may be controlled by a third-party, stored remotely from the community device 100, or subject to a copyright or license prohibiting modification. The community engine 106 can be configured to generate a message, or receive a message from a moderator, and send the message to the element author or entity in control of the element to request the modification to the element content. In some embodiments, the community engine 106 can be configured to periodically thereafter send a follow-up message to the author or entity repeating the request or review the content to detect a modification.

Exemplary Community-Based Content Aggregation Uses

Community-based content aggregation systems according to various embodiments can be used to collect elements associated with content that may be helpful to users and allow users to participate in the community to positively impact the community. The community environment may be a separate web-based application that is provided to a user on a webpage or at least parts of the community environment can overlay or be performed concurrently with another web-based application. The following is an example of a community-based content aggregation environment described with reference to screen shots in FIGS. 5-10.

Figure 5:
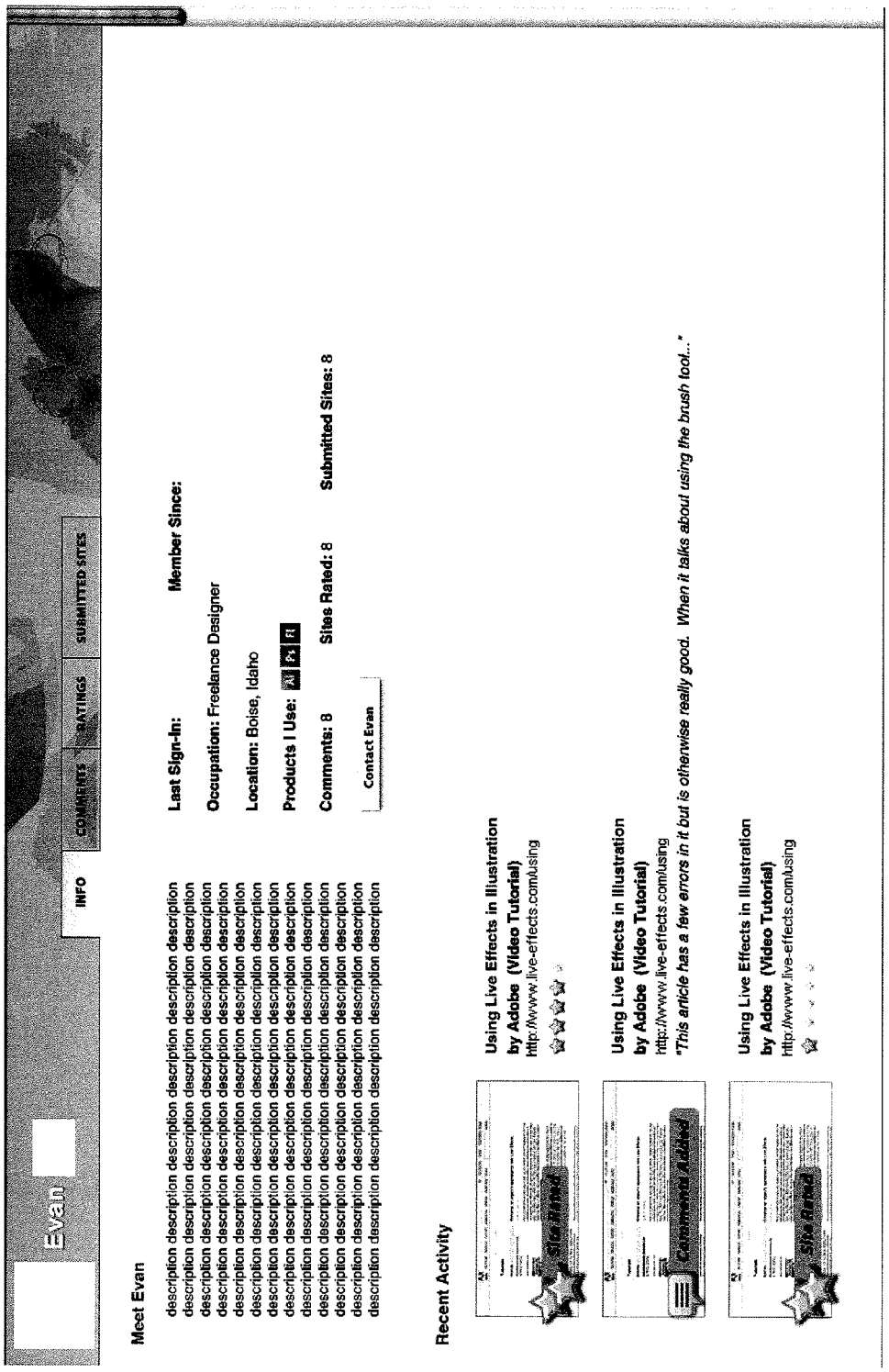
FIG. 5 is a screen shot of a user profile according to one embodiment of the present disclosure.

A user registers with the community-based content aggregation environment and a user profile is created for the user. FIG. 5 shows a user profile for a registered user. The user profile may be viewable by the user that is the subject of the user profile, users with certain user levels, such as administrators and moderators, and/or all community users. The user profile includes the user's name, occupation, location, contact option, products used that may be associated with the community topic, number of comments submitted, number of sites rated, and sites submitted. The sites refer to websites that are elements in accordance with some embodiments. The user profile may also include recent community activity in which the user participated. Tabs may be provided in which additional details associated with the user's comments, ratings, and submitted sites can be received.

Figure 6:
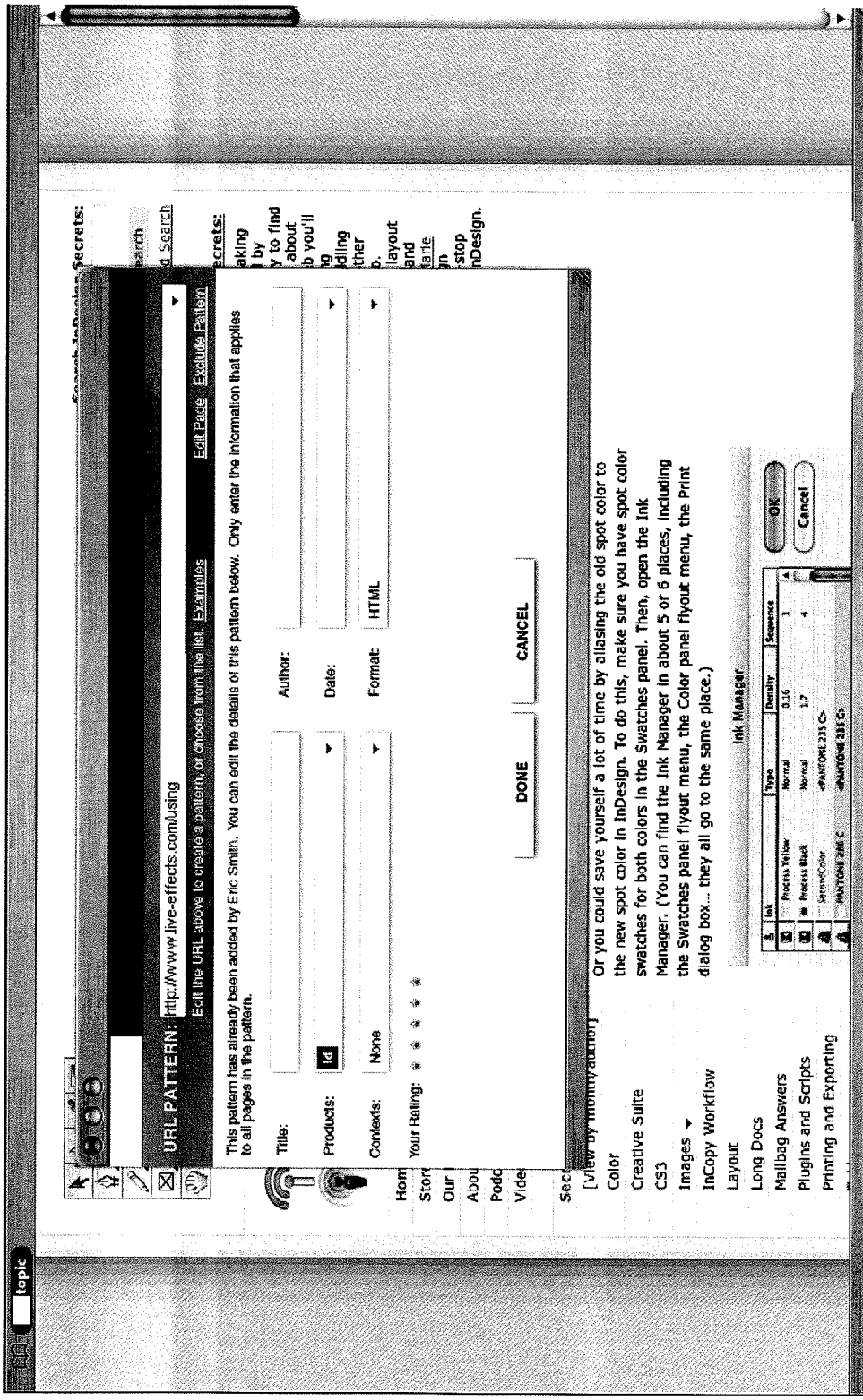
FIG. 6 is a screen shot of user submitting an element for consideration according to one embodiment of the present disclosure.

After registration, the user can submit an element for consideration for inclusion in the community. FIG. 6 shows a user submitting an element that is a URL to a website including content associated with a community topic. The user provides the URL and additional information, if known, about the element via fill-in boxes. The additional information can include an element title, author, date, format, community topic or subtopic to which the content relates, shown as "Products." The user can submit the element and additional information to a community engine for subsequent consideration by a moderator.

Figure 7:
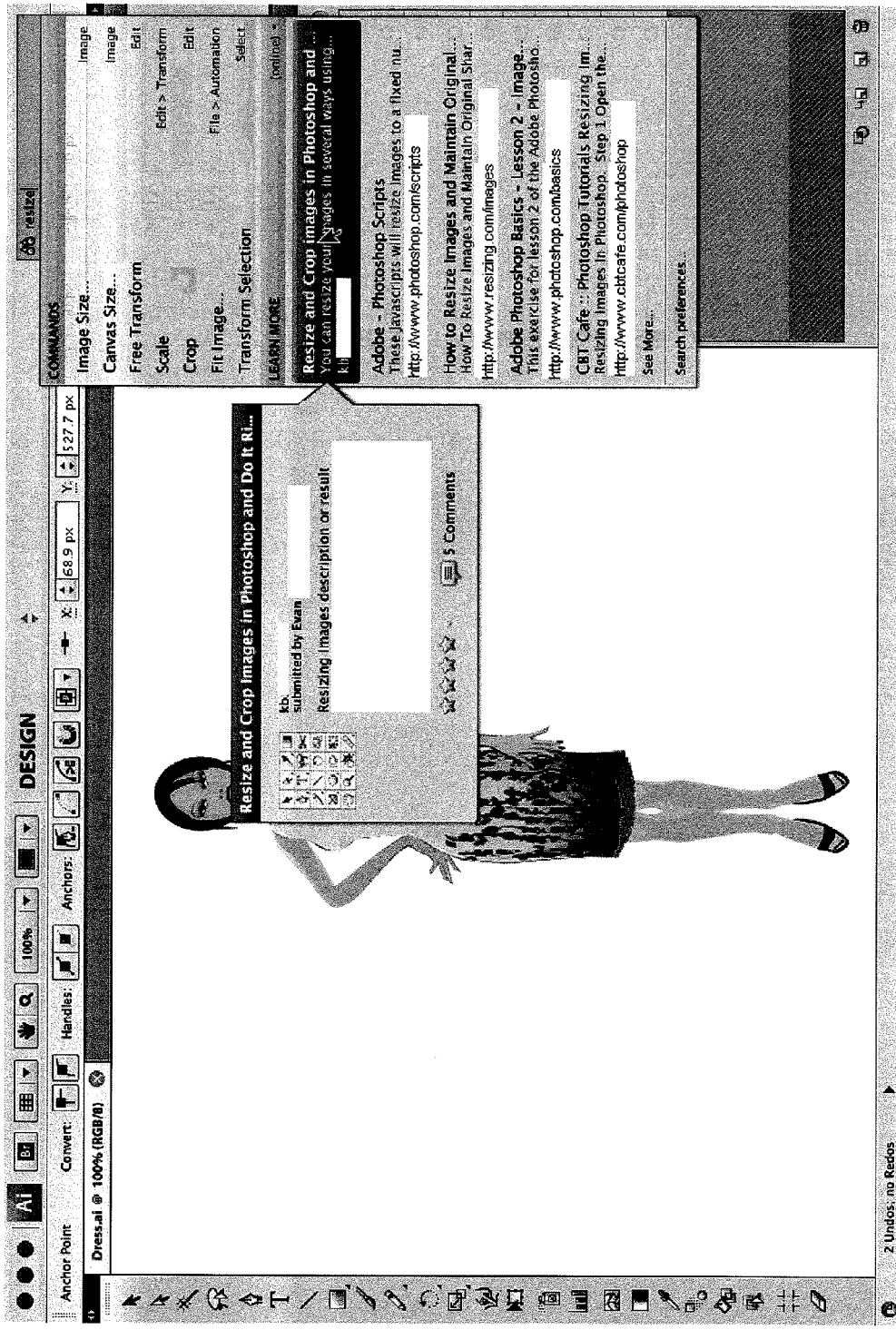
FIG. 7 is a screen shot of search results returned in response to a search conducted within an application according to one embodiment of the present disclosure.
Figure 8:
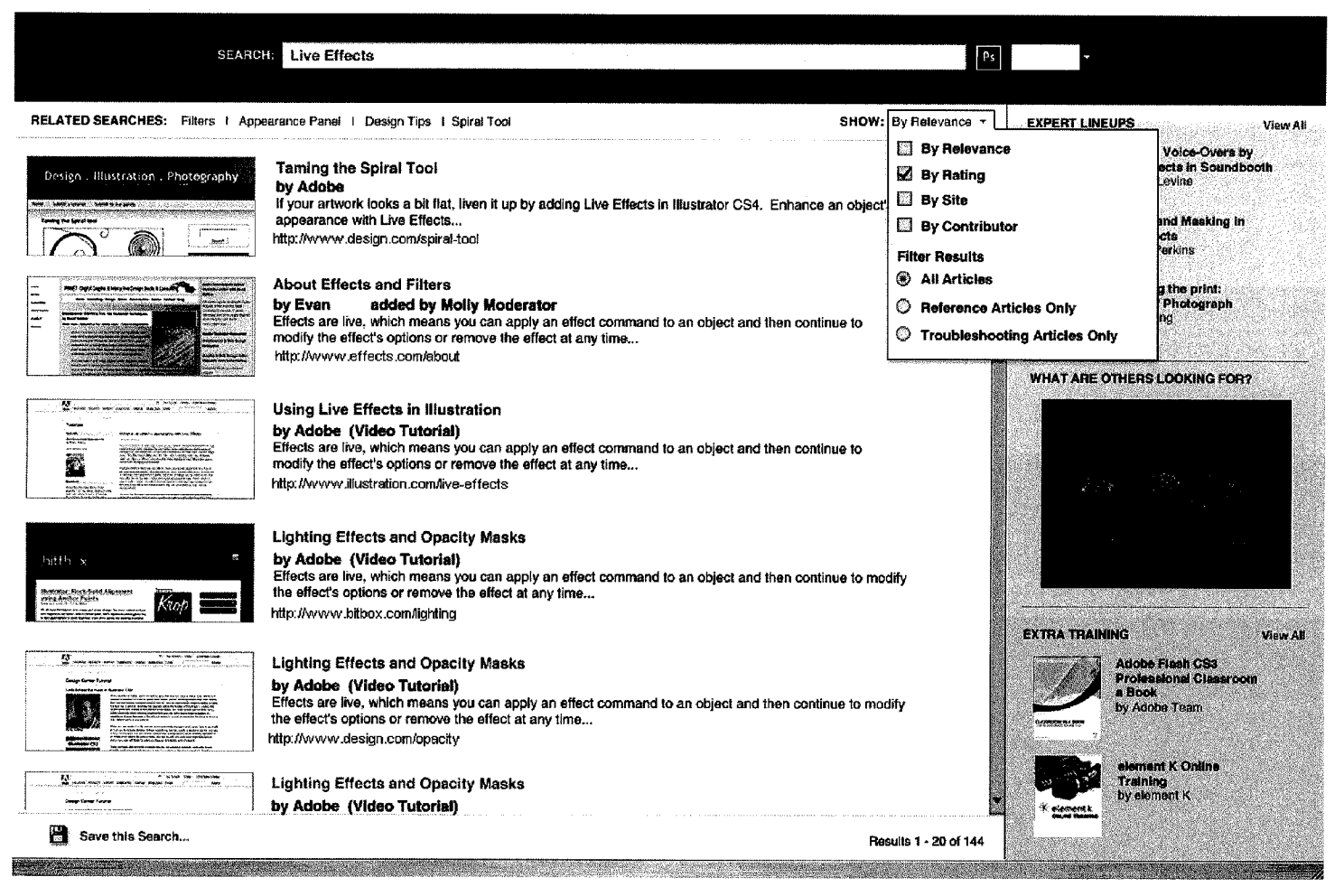

The user may also conduct a search for information by entering a search parameter that is shown with the word "resize". As shown in FIG. 7, the search can be performed while the user is using another application, such as a software application for creating drawings, and the community topic may be the software application and using the software application. For example, the user may wish to search for information on how to perform a certain function using the software application. The community provides the user with access to content regarding that topic. The search can provide a guided search that suggests additional or different search terms or words that may be related to the word entered by the user. After conducting the search, the community engine may return the top five elements in response to the search parameters and list information from element attributes about each element. The user can scroll over an element, or select it using an input device such as a mouse, to cause additional information from the element attributes about the element to appear. The search results may also be provided on a separate webpage with additional details about each element as shown in FIG. 8. The user may sort the results based on criteria such as relevance to search parameters, rating, site name, contributor, and type of element. If the user selects an element, a webpage that includes the contents of the element may be provided to the user.

Figure 9:
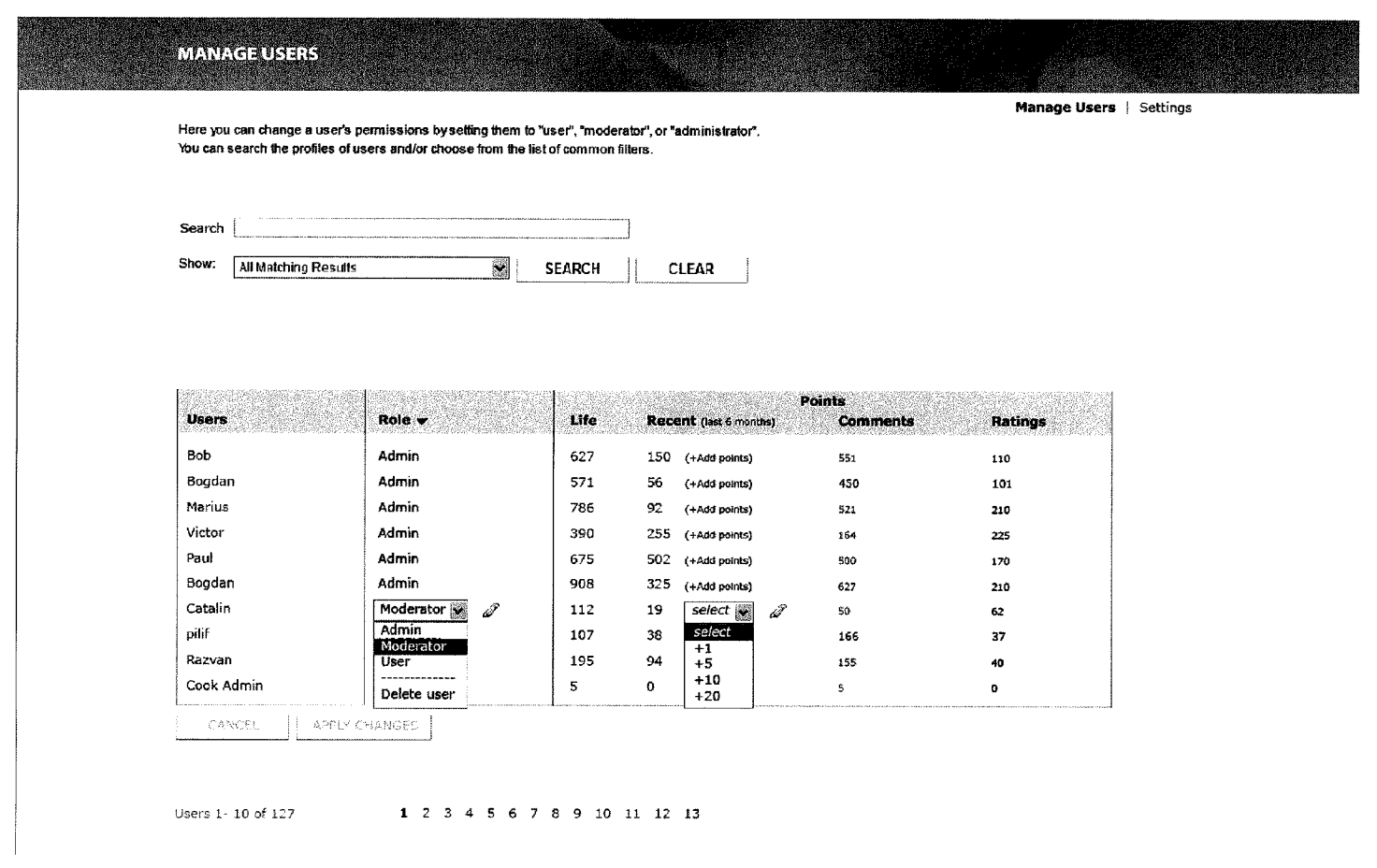

Administrators and moderators may have access to additional community tools for content management and user management functions. FIG. 9 shows a community tool for an administrator in which community users are listed, along with their permissions and community activity. The administrator can search the information included in the community tool and modify the characteristics for each user. The community tool can also provide points for each user, including both recent points and points attained over the course of the user's participation in the community.

Figure 10:
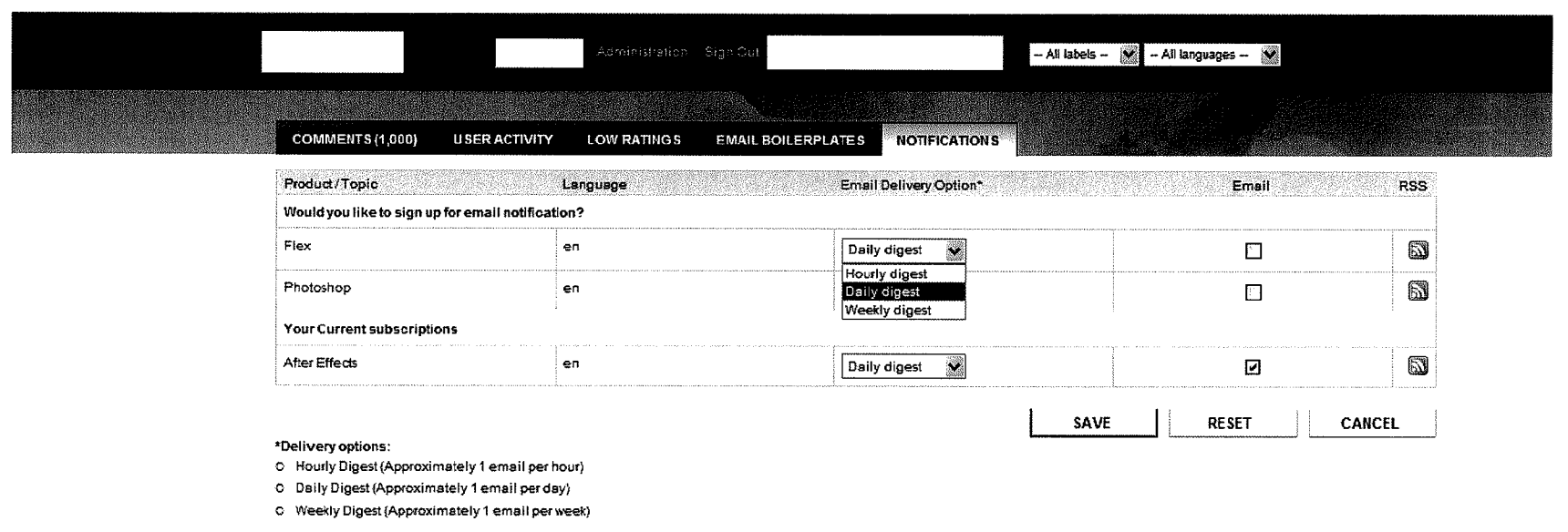

The administrators or moderators can also access a community tool that provides them with notifications upon certain events occurring within the community environment. FIG. 10 shows a notification page in which administrators or moderators can select to receive notifications on a periodic basis for changes within the community environment to elements associated with selected topics.

The following are examples of ways in which community users can participate in the community to promote community goals using community tools provided by some embodiments of the community-based aggregation system.

Moderator Improves Content

In one example, a moderator receives a user search request for which no elements were returned or a user search request for which no returned elements were selected. The moderator searches for and locates elements related to the search or creates an element related to the search and adds the element to the community, along with at least some element attributes for the element.

A moderator receives a list of elements having a low rating, a large number of comments, or identified by a community user as containing inappropriate content. The moderator deletes the elements, edits the elements, or sends a message to the content author with a request that they modify the elements.

Label Modification

The moderator receives a list of labels for which a small number of elements are associated with the labels, elements associated with the labels are infrequently selected, or the labels have not been used often to filter searches. The moderator edits the label, deletes the label, or adds an element to the label to ensure labels are used or are otherwise discarded from the community. The moderator may also receive a list of labels that are associated with a large number of elements and reviews at least some of the elements to determine if a new label can be added to split the elements using the new label.

Search Enhancements

A community user filters search results by rating, number of comments, added date, or labels.

A moderator reviews statistics for elements within a label and determines that some of the elements are highly rated. The moderator modifies the search properties in the element attributes for the highly rated elements to increase the search score to allow the elements to be returned in a higher place in the search results order.

A user downloads a selected number of search results based on user-selected criteria, such as top rated or most viewed results. The selected number of search results can be combined with other content, such as help-related content in an application. The user can search or browse the combined selected number of search results and other content off-line and use the information while performing tasks in an application, such as a document or image generator or editor application.

Community User Management

An administrator reviews statistics showing the number of moderators for each community topic or a geographical area, such as a country. The administrator identifies one or more geographical areas or topics for which additional moderators are needed. The administrator identifies and selects the most active registered users on the topic or within the geographical area and provides an instruction to modify the user level of the selected users to moderator. In some embodiments, a community engine can identify and select one or more users to modify the user level of the selected users to a moderator.

A moderator receives a list of the most active registered users for a selected label. The moderator sends a message to the most active registered user and requests their interest in becoming a moderator. Upon receipt of a message that the registered user is interested, the moderator sends a message to an administrator to nominate the registered user to a moderator user level.

The foregoing description of the embodiments of the inventive concepts has been presented only for the purpose of illustration and description and is not intended to be exhaustive or to limit the inventive concepts to the precise forms disclosed. Numerous modifications and adaptations are apparent to those skilled in the art without departing from the spirit and scope of the inventive concepts.

What is claimed is:

1. A computer-implemented method for managing users of a community-based content aggregation environment, the method comprising:
   creating, by a processor device executing code stored on a non-transitory computer-readable storage medium, a user profile for a user providing a registration request;
   assigning a first user level to the user, the first user level corresponding to access to a first set of community tools;
   detecting user activity, wherein user activity comprises receiving an element from the user comprising content related to a community topic or receiving element attributes from the user comprising a comment, a rating, or a label identifying a sub-topic of the community topic;
   providing the element or the element attributes to a moderator, wherein the moderator is at least one user that is charged with approving elements or element attributes;
   receiving an instruction from the moderator to approve the element or the element attributes;
   determining points to award to the user based on the approval of the element or the element attributes by the moderator;
   storing the points in the user profile;
   determining that points in the user profile exceed a pre-set threshold; and
   modifying the first user level to a second user level based on determining that points in the user profile exceed the pre-set threshold, the second user level allowing the user to access the first set of community tools and a second set of community tools.

2. The computer-implemented method of claim 1, wherein the second user level is assigned to the moderator.

3. The computer-implemented method of claim 1, wherein content received when detecting user activity comprises at least one of:
   an element submitted by the user to be added to the community-based content aggregation environment;
   a comment from the user;
   a pre-set number of comments from the user within a pre-set time;
   a modification to an element; or
   an identification of a sub-topic of a community topic for which an element is needed.

4. The computer-implemented method of claim 1, further comprising:
   creating a second user profile for a second user allowing the second user to access the first set of community tools; and wherein content received when detecting user activity comprises:
      an element from the user related to a community topic; and
   element attributes associated with the element, the element attributes comprising a comment from the second user, a rating, and a label identifying a sub-topic of the community topic.

5. The computer-implemented method of claim 4, further comprising:
   providing the element attributes to the moderator;
   receiving approval of the element attributes from the moderator; and
   wherein the points to award to the second user are determined after receiving approval of the element attributes from the moderator.

6. The computer-implemented method of claim 4, further comprising:
   receiving a search request regarding the community topic; and
   providing output of the element and at least part of the element attributes in response to the search request.

7. The computer-implemented method of claim 5, further comprising:
   receiving an instruction from the moderator to perform a content management function comprising modifying the element or element attributes.

8. The computer-implemented method of claim 4, further comprising:
   providing statistics on a number of users having a second user level for at least one of the community topic or a geographical area.

9. The computer-implemented method of claim 5, further comprising:
   receiving an instruction from the moderator to perform a user management function comprising: modifying the first user level stored in the first user profile to the second user level, the second user level allowing the first user to access moderator community tools.

10. The computer-implemented method of claim 4, further comprising:
    receiving an edit to the element;
    receiving an instruction to delete the element; or
    receiving an instruction to modify element attributes.

11. A system for managing users of a community-based content aggregation environment, the system comprising:
    a processor-based device comprising a community engine stored on a non-transitory computer-readable medium and executable by a processor, the community engine being adapted to:
    create a first user profile for a user providing a registration request;
    assign a first user level to the user, the first user level corresponding to access to a first set of community tools;
    detect user activity, wherein user activity comprises receiving an element from the user comprising content related to a community topic or receiving element attributes from the user comprising a comment, a rating, or a label identifying a sub-topic of the community topic;
    provide the element or the element attributes to a moderator, wherein the moderator is at least one user charged with approving content;
    determine points to award to the user based on the approval of the element or the element attributes by the moderator;

store the points in the first user profile;
determine whether the points in the first user profile exceed a pre-set threshold; and
modify the first user level to a second user level based on determining that points in the first user profile exceed the pre-set threshold, the second user level allowing the user to access the first set of community tools and a second set of community tools.

12. The system of claim 11, wherein content comprises an element related to a community topic and wherein the community engine is further adapted to:
create a second user profile for a second user, the second user profile comprising a first user level, the first user level allowing the second user to access a first set of community tools; and wherein detect user activity comprises:
receive element attributes associated with the element, the element attributes comprising a comment from the second user, a rating, and a label identifying a sub-topic of the community topic.

13. The system of claim 12, wherein the community engine is further adapted to:
determine points to award to the second user based on approval of the comment by the moderator.

14. A non-transitory computer-readable medium on which program code is stored for managing users of a community-based content aggregation environment, the non-transitory computer-readable medium comprising:
program code for creating a user profile for a user providing a registration request;
program code for assigning a first user level to the user, the first user level corresponding to access to a first set of community tools;
program code for detecting user activity, wherein user activity comprises receiving an element from the user comprising content related to a community topic or receiving element attributes from the user comprising a comment, a rating, or a label identifying a sub-topic of the community topic;
program code for providing the element or the element attributes to a moderator, wherein the moderator is at least one user charged with approving content;
program code for determining points to award to the user based on the approval of the element or the element attributes by the moderator;
program code for storing the points in the user profile;
program code for determining whether the points in the user profile exceed a pre-set threshold; and
program code for modifying the first user level to a second user level based on determining that points in the user profile exceed the pre-set threshold, the second user level allowing the user to access the first set of community tools and a second set of community tools.

* * * * *